No. 614,947. Patented Nov. 29, 1898.
G. D. GILLETTE.
ROTARY CUTTER.
(Application filed Nov. 9, 1895.)
(No Model.)
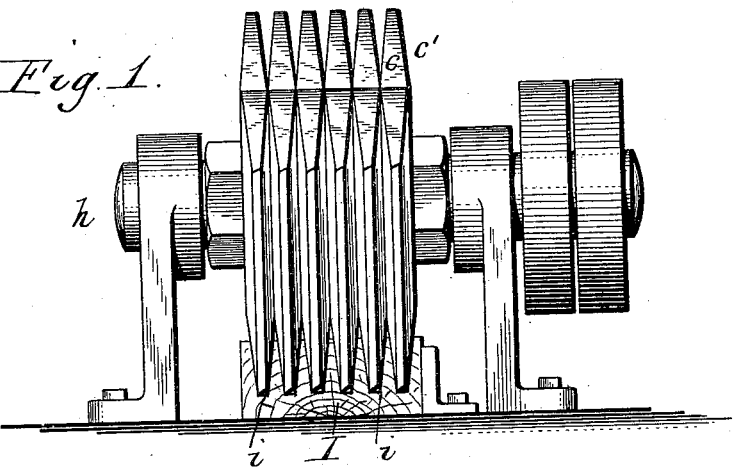
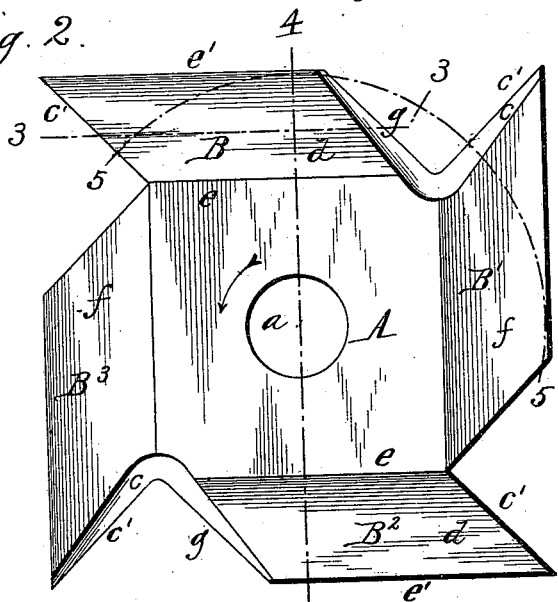
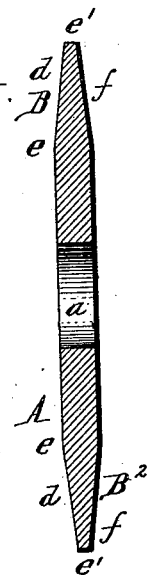
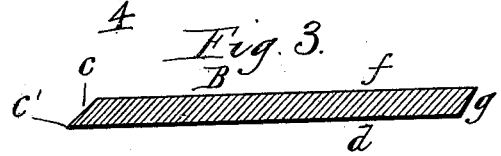
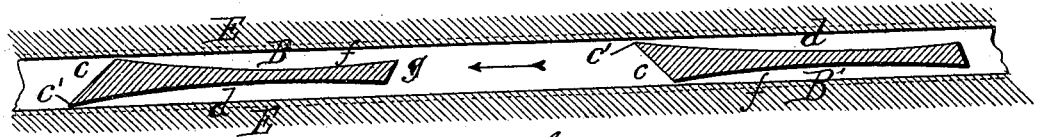
WITNESSES: George D. Gillette INVENTOR.
Chas. F. Burkhardt. By Wilhelm Bonner
Theo. L. Popp. ATTORNEYS.
THE NORRIS PETERS CO., PHOTO-LITHO., WASHINGTON, D. C.

UNITED STATES PATENT OFFICE.

GEORGE D. GILLETTE, OF OSWEGO, NEW YORK, ASSIGNOR TO D. H. BURRELL & CO., OF LITTLE FALLS, NEW YORK.

ROTARY CUTTER.

SPECIFICATION forming part of Letters Patent No. 614,947, dated November 29, 1898.

Application filed November 9, 1895. Serial No. 568,423. (No model.)

*To all whom it may concern:*

Be it known that I, GEORGE D. GILLETTE, a citizen of the United States, residing at Oswego, in the county of Oswego and State of New York, have invented a new and useful Improvement in Rotary Cutters for Woodwork, of which the following is a specification.

This invention relates to a rotary cutter which is employed for cutting a groove with beveled or sloping sides in a plank or board, and has the object to produce a simple and efficient cutter which will not bind or heat in cutting and which will produce a groove with smoothly-planed sides rapidly and with a comparatively small expenditure of power.

In the accompanying drawings, Figure 1 is a face elevation of a number of my improved cutters arranged side by side upon the same mandrel for cutting a number of parallel grooves simultaneously. Fig. 2 is a side elevation of one of my improved cutters on an enlarged scale. Fig. 3 is a longitudinal section of one of the teeth of the cutter in line 3 3, Fig. 2, on an enlarged scale. Fig. 4 is a diametrical section through the cutter in line 4 4, Fig. 2. Fig. 5 is a longitudinal section of two succeeding teeth, taken in the circular line 5 5, Fig. 2, on an enlarged scale.

Like letters of reference refer to like parts in the several figures.

A represents the body or plate of the cutter, provided with a central opening $a$, through which the mandrel or shaft passes on which the cutter is mounted.

B B' B² B³ represent the teeth or blades of the cutter, of which an even number are employed and which are preferably formed integrally with the body or plate A. Each tooth has a front or cutting face $c$, which is arranged radially, or nearly so, and which is beveled transversely, the bevel or inclination being from the front edge $c'$ of the cutting-face toward opposite sides of the cutter in succeeding teeth, as clearly shown in Figs. 2 and 5, so that the teeth cut or plane alternately opposite sides of the groove which the cutter is forming in the plank or board. Each tooth has its side $d$, in which its front cutting edge $c'$ is formed, sloping or inclined from the body A of the cutter or the base $e$ of the tooth to the outer edge $e'$ of the tooth, and this side $d$ is plane and not conical, so that the cutting sides $d$ of the teeth form flat or plane faces which slope from the outer edges of the polygonal body A of the cutter outwardly to the outer edges $e'$ of the teeth. As each point of the cutter moves in a circular line concentric with the center of the cutter, the cutting side $d$ recedes slightly from the side E of the groove which is being cut from the cutting edge $c'$ rearwardly, as indicated by the diagram Fig. 5, since each circle drawn through a point in the cutting edge passes from the cutting edge outwardly into a thinner portion of the tooth until the line is reached which stands at right angles to the base or root of the tooth. For instance, as shown in Fig. 2, the line 4 4 intersects the base of the tooth A at right angles, and any circular line 5 5 drawn through any point in the cutting edge $c'$ passes from that edge over gradually thinner portions of the tooth until the line 4 4 is reached. The greater portion of each tooth is arranged in front of that line in the direction in which the cutter rotates, (indicated by the arrow in Fig. 2,) so that the thickness of the tooth in rear of that line is less in any circular line than it is in front, which prevents the rear portion of the cutting side $d$ from touching the side of the groove which is being cut. In other words, the cutting side $d$ recedes from the side of the groove almost to the rear end of the tooth, and although it approaches the side of the groove again after the line 4 4 has been passed it does not approach so far as to interfere with the clearance which is furnished by the plane sloping side of the tooth and which is necessary in rear of the cutting edge to prevent the tooth from binding against the side of the groove. The rear or non-cutting edge of the oblique or beveled front face of each tooth clears the side of the groove which is being cut, because each point in this rear edge lies in an outer and thinner part of the tooth than the point in the front edge which lies in the same circle concentric with the axis of rotation. The opposite or off side $f$ of each tooth, toward which the cutting-face $c$ is beveled, is preferably formed in the same way, so that each tooth has two plane sides $d$ and $f$, which converge or slope from the base to the outer edge of each tooth, as shown in Figs. 1 and 3. When both sides of each tooth are so formed, the teeth stand behind each other without being offset to either side, as shown in Fig. 5, and yet the teeth cut alternately against opposite sides of the groove and clear the groove with the non-cutting edges of their front faces. The back $g$ of each tooth may be beveled transversely like the cutting-face, or nearly so, and is preferably arranged parallel with the cutting-face from the base to the outer edge of the tooth.

A number of these cutters may be secured side by side to a mandrel or shaft $h$ for cutting a number of tapering grooves $i$ in a board I—as, for instance, in making curtain-slats or blind-slats, the portions left standing between the grooves forming the slats. When curtain-slats are being made, the rounded backs of the slats are formed by a separate cutter of proper form, and when blind-slats are made two sets of cutters like that shown in Fig. 1 are used upon opposite sides of the board.

I claim as my invention—

1. A rotary cutter for woodworking having teeth projecting from a plate or body and having the cutting-faces of succeeding teeth beveled transversely in opposite directions and having the side of each tooth in which its front or cutting edge is arranged plane and beveled or sloping from the base of the tooth to the outer edge thereof and having the rear edge of the beveled cutting-face constructed with a clearance, substantially as set forth.

2. A rotary cutter for woodworking having a polygonal body and teeth projecting from the edges thereof, the teeth having their cutting-faces beveled alternately in opposite directions and having both sides of each tooth plane and sloping or converging from the straight base of each tooth to the outer edge thereof, the rear face of each tooth being cut away more than the front face to give a clearance at the heel, substantially as set forth.

Witness my hand this 5th day of November, 1895.

GEORGE D. GILLETTE.

Witnesses:
JAS. C. HARDING,
H. D. PIERCE.